July 22, 1930. G. H. EMERSON 1,771,291
FIRE BOX FOR BOILERS
Filed Sept. 22, 1927 12 Sheets-Sheet 2

Fig. 2.

INVENTOR.
George H. Emerson
BY
ATTORNEY.

Fig. 4.

July 22, 1930.  G. H. EMERSON  1,771,291
FIRE BOX FOR BOILERS
Filed Sept. 22, 1927    12 Sheets-Sheet 6

Fig. 6.

July 22, 1930.  G. H. EMERSON  1,771,291
FIRE BOX FOR BOILERS
Filed Sept. 22, 1927    12 Sheets-Sheet 9

Fig. 9.

INVENTOR.
George H. Emerson
BY
ATTORNEY.

July 22, 1930.  G. H. EMERSON  1,771,291
FIRE BOX FOR BOILERS
Filed Sept. 22, 1927   12 Sheets-Sheet 11

Patented July 22, 1930

1,771,291

UNITED STATES PATENT OFFICE

GEORGE H. EMERSON, OF BALTIMORE, MARYLAND

FIRE BOX FOR BOILERS

Application filed September 22, 1927. Serial No. 221,265.

One of the objects of my invention is to provide a construction of fire box for boilers, to increase evaporation, and reduce materially stoking and fuel consumption.

Another object of my invention is to make it possible to clean the headers and side water tubes without entering the structure, such cleaning being done from the running board of the locomotive, whereby the time required for this cleaning is reduced from approximately five days to five hours.

Another object of my invention is to eliminate or reduce to a greater extent the number of hand holes in the cab, thus giving greater protection to the engineer and fireman from injuries due to breaks in steam joints.

Another object of my invention is to eliminate all stay bolts, except in the front and back heads where short and straight stay bolts are used; and with these and other objects in view, my invention consists of the parts and combination of parts hereinafter pointed out.

Figure 1:
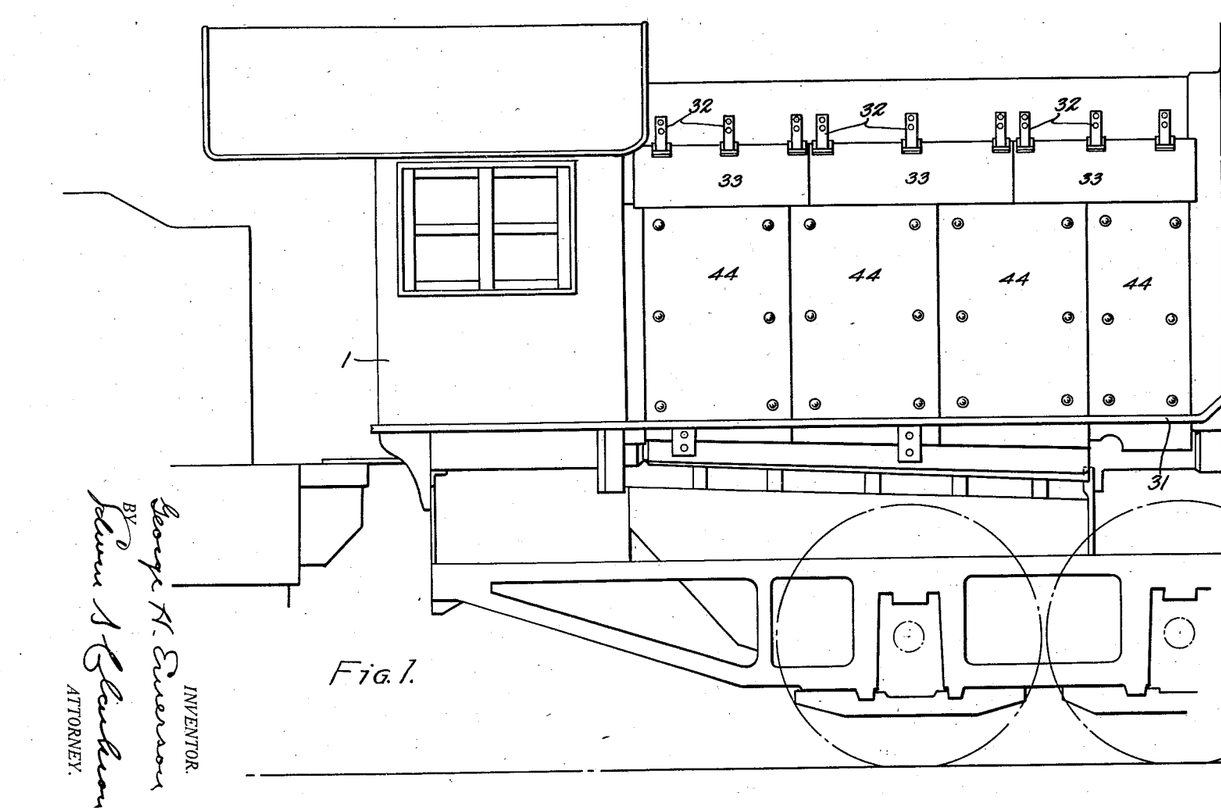
Figure 1 is a side elevation of a locomotive (parts omitted) embodying my invention.
Figure 2:
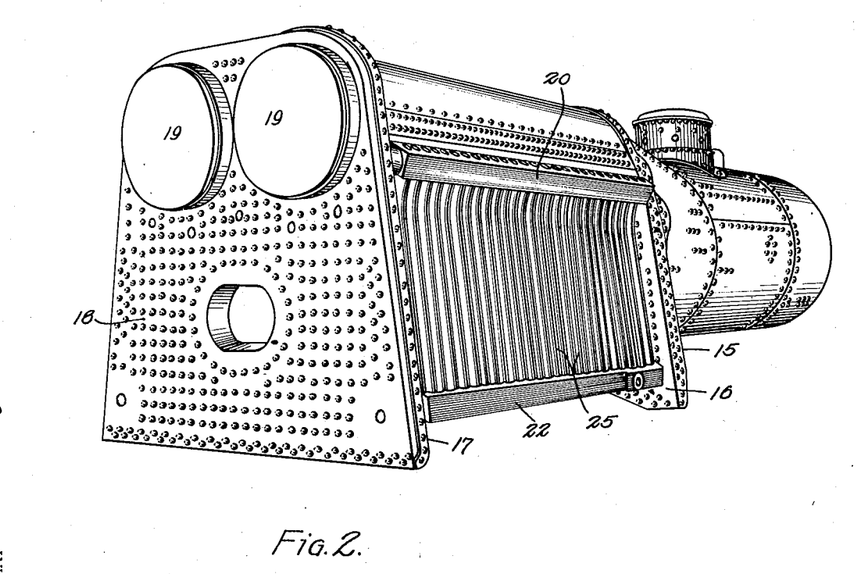
Figure 2 is a perspective view of my improved fire box, and associated parts.
Figure 3:
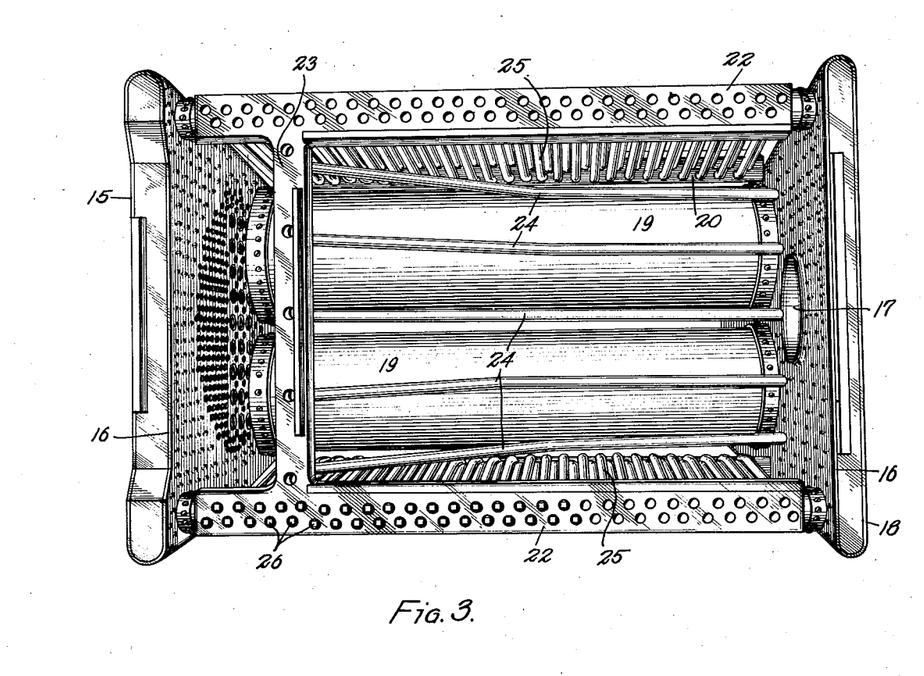
Figure 3 is a bottom perspective of my improved fire box.
Figure 4:
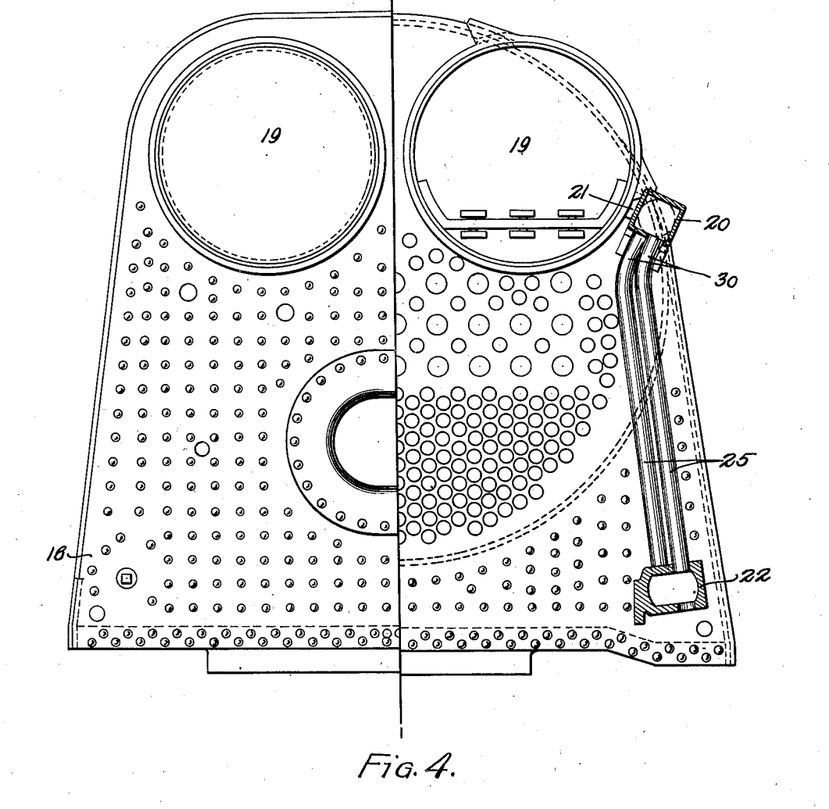
Figure 4 is a front elevation of my improved fire box looking at the door sheet, one half of the door sheet and back head being omitted.
Figure 5:
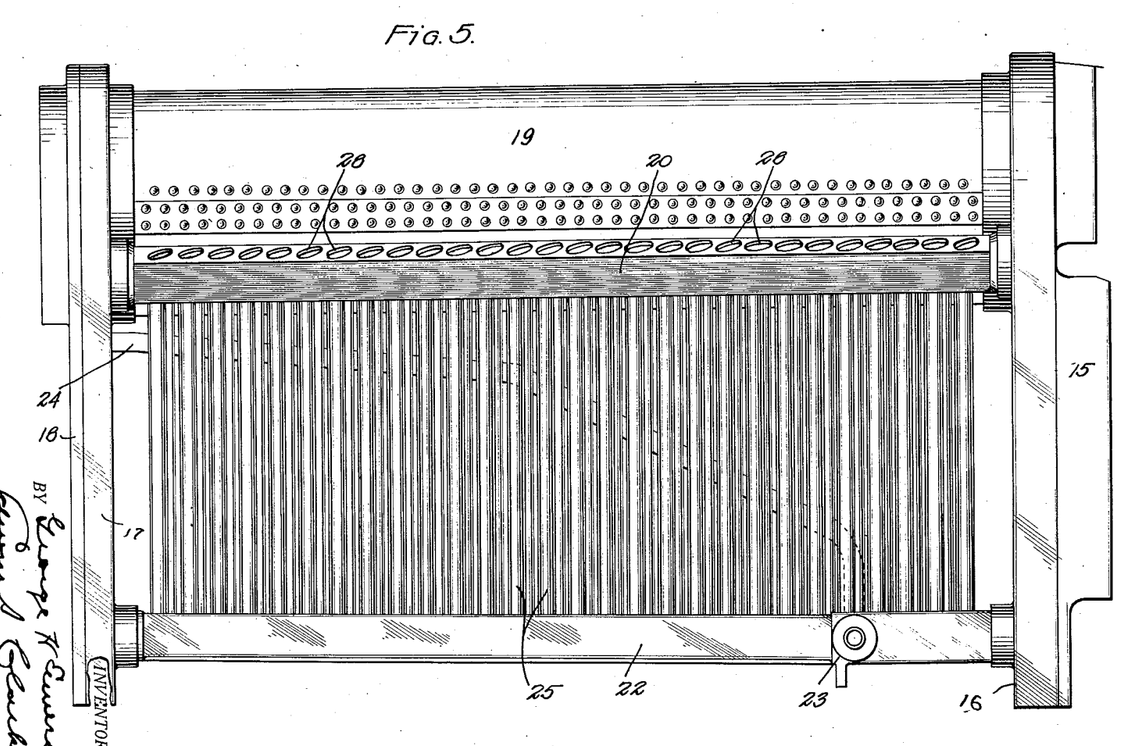
Figure 5 is a side elevation of my improved fire box with brick and other insulation omitted.
Figure 6:
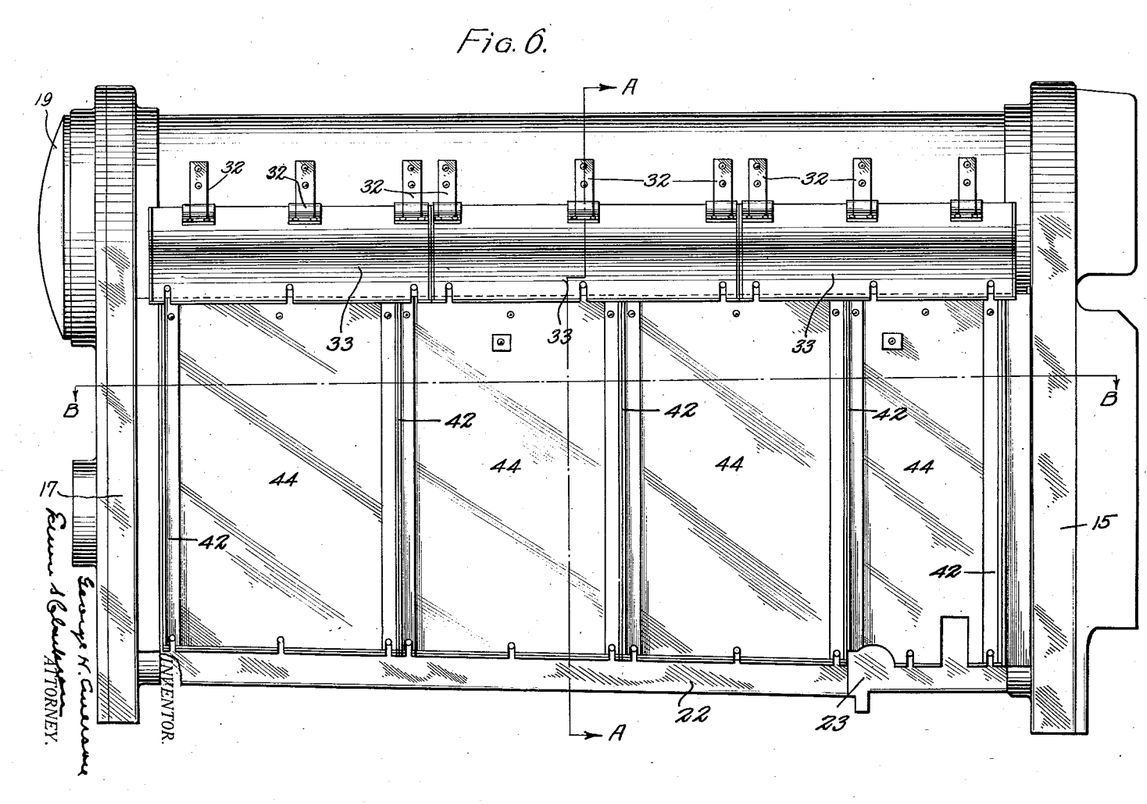
Figure 6 is a side elevation of my improved fire box similar to Figure 5, with the header doors and the insulation added.
Figure 7:
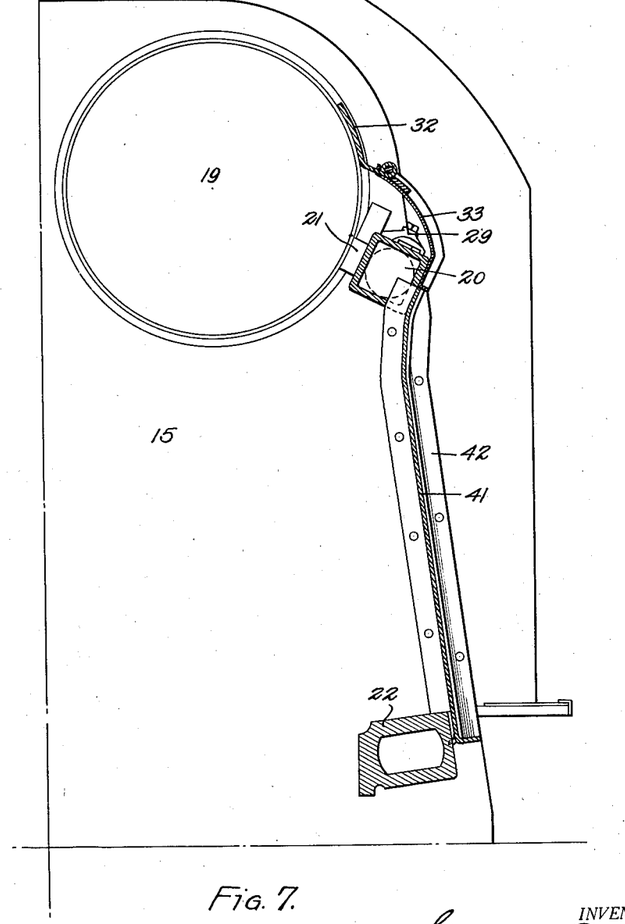
Figure 7 is a sectional view on the line A—A, Figure 6, the brick and other insulation being omitted.
Figure 8:
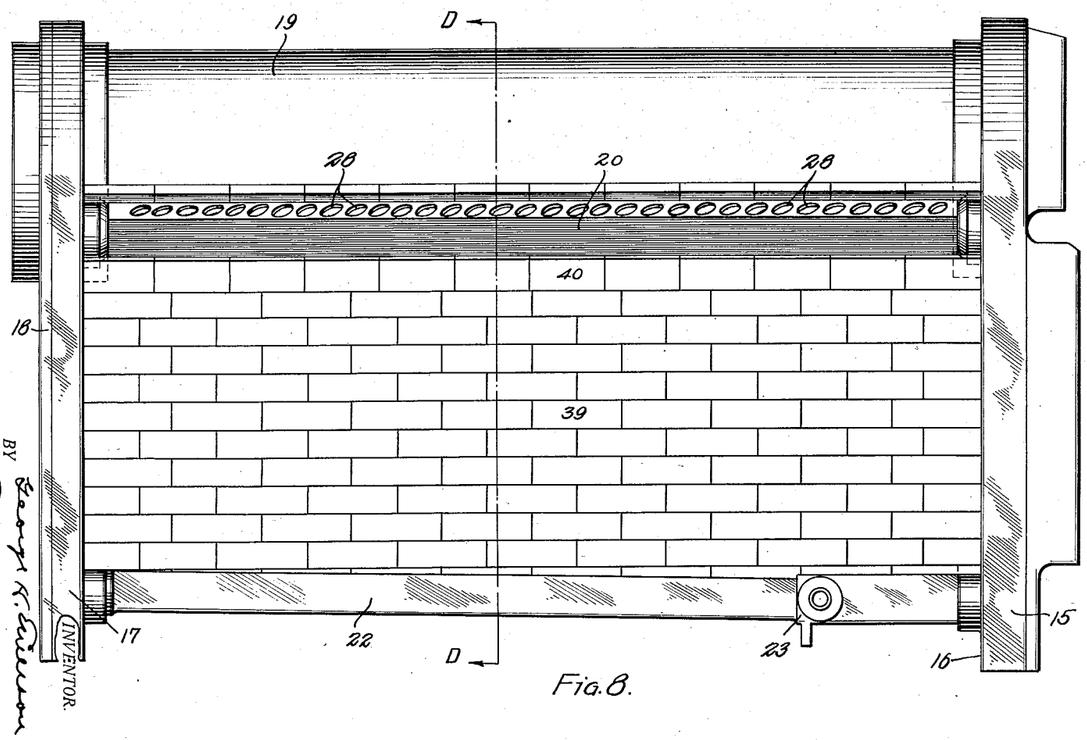
Figure 8 is a side elevation of my improved fire box showing the application of fire brick.

The reference numeral 1 designates a locomotive.

My improved water tube fire box consists of a throat sheet 15, back flue sheet 16, door sheet 17, back head 18. Attached to the back flue sheet, door sheet, and back head are two longitudinally disposed drums 19.

Running parallel with the drums 19 are two top headers 20 which are connected with the drums by circulating tubes 21, one header 20 being connected to the outside of each drum.

At the bottom of the fire box, connected to the back flue sheet and to the door sheet, is a metal frame 22, which functions as a circulating member, as well as a support for the grates, and forming a portion of the combustion chamber. This circulating member is provided with a transversely disposed water leg 23 from which the water tubes 24 extend, the other ends of the tubes 24 being connected with the door sheet 17. These tubes 24 also constitute a support for the brick arch. The bottom circulating member, or lower header 22 supports the grates and forms a portion of the combustion chamber. Of course it is understood that the transverse leg 23 is in constant open communication with the bottom circulating member 22.

Connected to and in constant open communication with the bottom frame 22 and the top headers 20, are a number of vertical water circulating tubes 25 which are arranged in staggered relation as clearly shown in the drawing, said tubes 25 forming the sides of the fire box. This fire box results in a very rapid circulation of the water, a very high ratio of heat transfer and very quick steaming, due to the fact that the water in the vertical tubes 25 is broken up into relatively small particles, each surrounded by a relatively large effective heating surface.

The arrangement of the top headers 20 which take all of the circulation from the vertical tubes 25 and connect to the drums through the nipples 21 causes a violent circulation in the drums 19, which in turn acts as a safety device, as the part of the drums (equivalent to the crown sheet of an ordinary boiler) in contact with the fire, will always be covered with water even though the water level in the boiler itself should actually fall below the water level of the bottom of the drums 19, as the water is forced upward by violent circulation.

The side vertical tubes 25 are rolled at the bottom by removing the plugs 26 at the bottom of the circulating frame 22.

Figure 10:
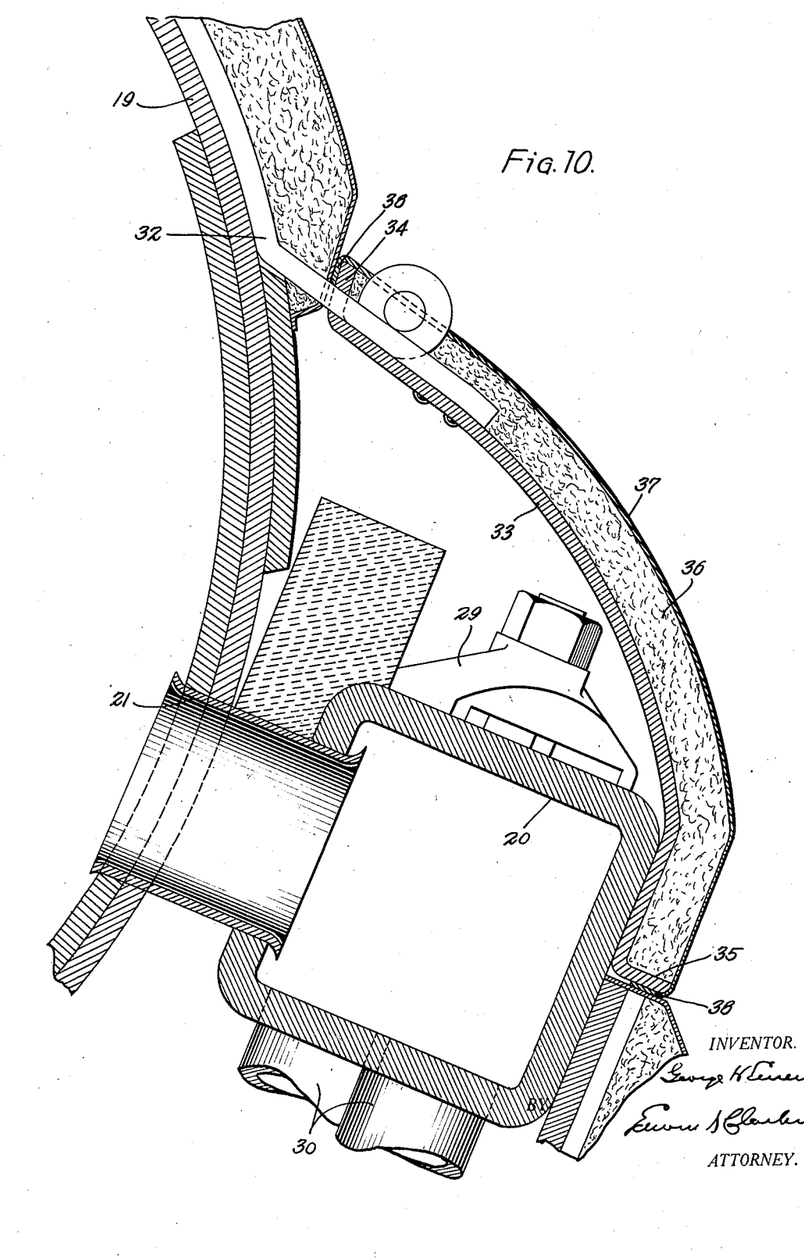
Figure 10 is an enlarged detail vertical sectional view through the top header, its doors and immediately associated parts.
Figure 11:
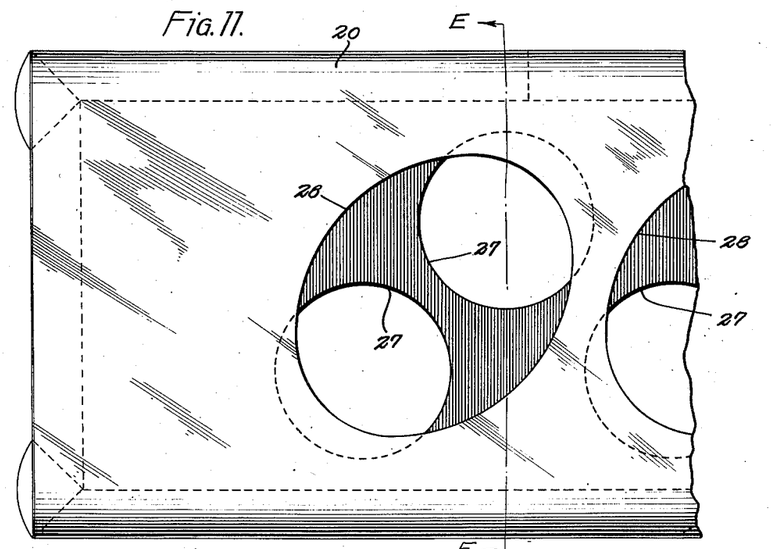
Figure 11 is a fragmentary top plan view of one of the top headers.
Figure 12:
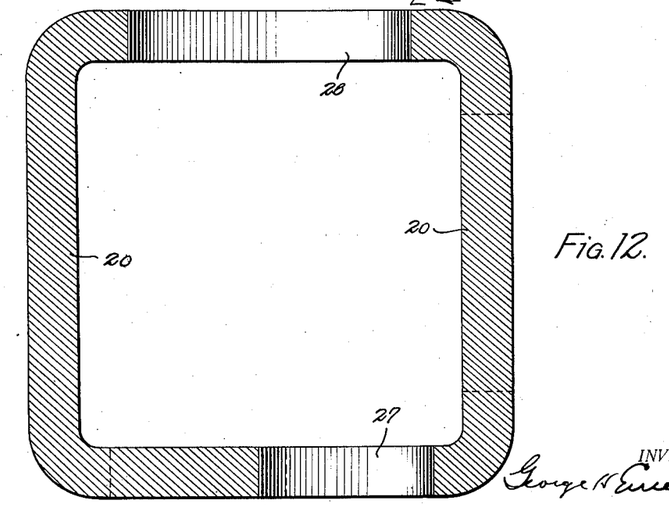
Figure 12 is a sectional view on the line E—E, Figure 11.

The top headers 20, as more clearly shown in Figure 10, are provided with tube holes 27 in staggered relation throughout the length of its bottom wall into which the upper ends of the vertical circulating tubes 25 are fitted, while the top wall of the upper headers 20 are provided with eliptical shaped hand hole openings 28, or round plugs similar to 26 each opening 28 bridging two of the tube openings 27 whereby two tubes 25 can be easily cleaned through one hand hole opening 28. The hand hole openings are provided with suitable closures 29. It will be noted that the upper end portions of the vertical circulating tubes 25 are deflected outwardly as at 30, whereby the top of the upper header is presented in a downwardly sloping angle, thereby greatly facilitating access into the header and the tubes 25, while the operator is standing on the running board 31 of the locomotive; another advantage of this construction is that all of the circulating tubes 25 can be applied and rolled, washed out and cleaned without the necessity of a workman getting inside of the boiler.

A hinge member 32 is suitably secured to the drum 19 to which a door 33 is hinged. This door is of such size that it covers a portion of the top header, there being a sufficient number of such doors to cover the header 20 throughout its length as best shown in Figure 1. The top and bottom marginal edges of the doors 33 are upturned as at 34 and 35 between which edges asbestos 36, or other suitable insulation, is secured by means of an outer covering or shell 37, the upper and lower edges 38 of which are inturned and overlap the marginal edges of the door and are suitably secured thereto. It will be readily seen that a workman standing on the running board 31 can readily open the doors 33 and have easy access to the top headers 20 and the vertical circulating tubes 25 for the purpose of applying and rolling and washing and cleaning said tubes 25 without entering the boiler. In washing and cleaning the tubes 25 this construction is important, when it is known that by such construction all the tubes 25 can be washed and cleaned in five hours, and without waiting for the boiler to cool; whereas with the present type of boilers and fire boxes, it is absolutely necessary to let the boiler and box cool down before the cleaning and washing can be commenced which, with the washing and cooling usually requires about five days, during all of which time the locomotive represents a non-productive property, so that the differences between five hours for cleaning and washing due to my invention as against five days under the present practice, becomes a very material one to the railroad.

Figure 9:
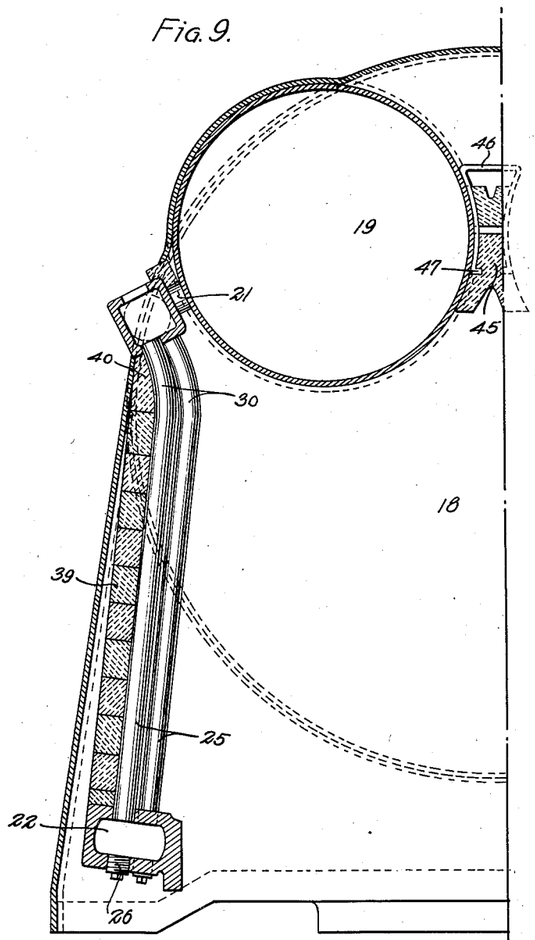
Figure 9 is a sectional view on the line D—D, Figure 8.

Fire brick 39 on the outside of the vertical tubes 25 are laid with high temperature cement, the side header brick 40 being bevelled to accommodate the curvature at the top of the tubes 25 as shown in Figure 9. Outside of the brick a metal sheet 41 is laid and suitably secured in place and on this sheet angle bars 42 are secured between which bars asbestos, or other suitable insulation 43, is laid and held in place by metal sheets 44 which are also suitably secured in position. The fire box is to be absolutely air tight.

Between the drums 19 I secure fire bricks 45 the vertical sides of which are concaved to fit the adjacent perimeter of the drums, and preferably I mount these bricks in hangers 46 the vertical sides of which conform to the vertical sides of the brick and terminate at their lower ends in lugs 47 which hook in grooves or recesses formed in the brick as shown in Figure 9.

It will be understood, of course, that the bricks and hangers may be initially mounted in position by engaging the bricks with the hangers and disposing the same between the drums 19 after one drum has been installed and during the placing in position of the other drum. New bricks may be substituted for old or damaged ones whenever dismantling of the boiler for overhauling is necessary. If desired, each brick may be formed of two horizontally divided sections so as to admit of ready and convenient replacement of brick sections in the event of damage to any of the brick sections without the necessity of disturbing the drums or other normally fixed parts of the boiler.

Figures 13, 14, 15:
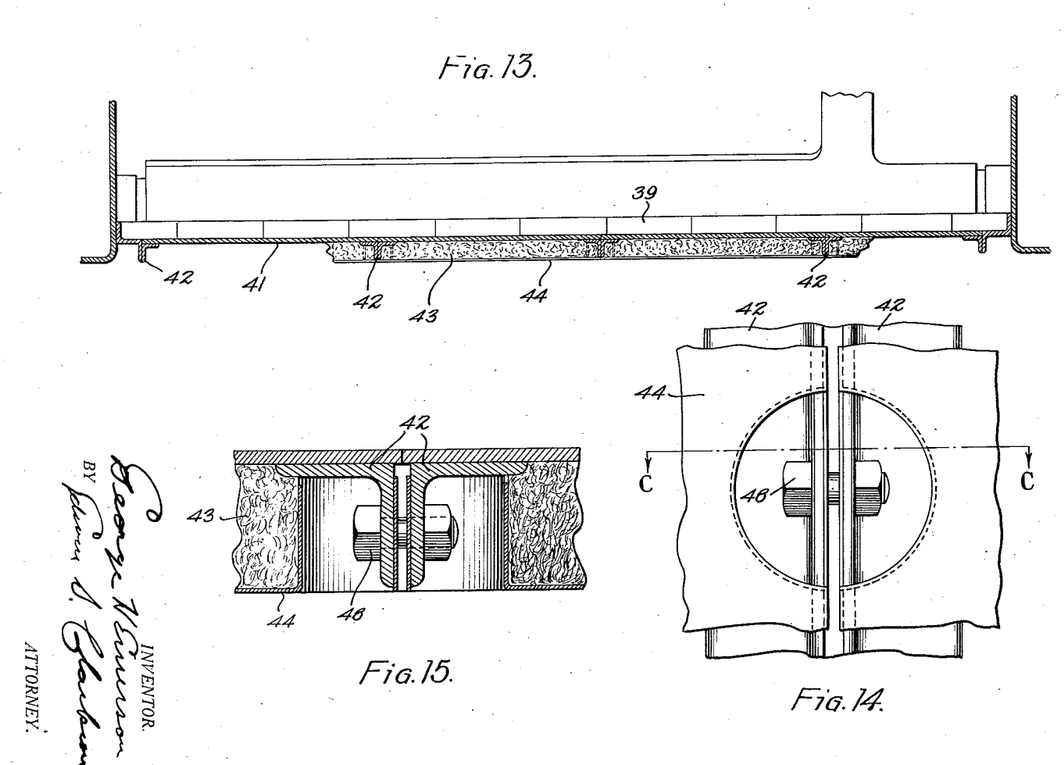
Figure 13 is a sectional view on the line B—B, Figure 6.
Figure 14 is an enlarged detail view, showing method of securing cover plates over side bricks.
Figure 15 is a sectional view on the line C—C, Figure 14.

The abutting edges of the sheets 44 are inturned and clamped between the angle irons 42, as clearly shown in Figures 14 and 15 and the sheets are cut away at the bolts 48 to give ready access to said bolts.

The following tabulation shows the comparison of the heat surface in square feet and the evaporation in pounds of water per hour, of the original boiler and fire box on locomotive E27 and my improved water tube fire box on the same locomotive which is designated Locomotive E-27X.

| Class of engine | Tubes | | Firebox | | Total |
|---|---|---|---|---|---|
| | Heating surface, sq. ft. | Evaporation lbs. water per hour | Heating surface, sq. ft. | Evaporation lbs. water per hour | Evaporation lbs. water per hour |
| E-27 | 2613 | 26755 | 180 | 9870 | 36625 |
| E-27X | 1597 | 22692 | 479 | 26345 | 49037 |

It will be noted by studying this table that the fire box evaporation has been increased almost 300% in the water tube boiler, and this has been done without increasing the grate area.

The above tabulation was made from the respective locomotives in actual service. In addition to the above it was found that with my improved fire box there is a saving of 50% in coal per 100 ton miles.

The circulating drums 20 are connected and in communication with the back flue sheet 16, while their other end is connected and in communication with the door sheet 17. The frame 22 which also functions as a circulating drum is connected at each end to and in open communication with the back flue sheet and the door sheet. This construction plus the vertical tubes 25 connecting the top and bottom circulating drums results in a very rapid circulation of the water, and a very high ratio of heat transfer, and very quick steaming.

What I claim is:—

1. In a fire box for a boiler, the combination with the back flue sheet and the door sheet, and side walls having openings therein, headers connecting said sheets, steam drums extending longitudinally of the box and supported by said sheets, the top headers being of rectangular cross section and set at an angle to the horizontal with their upper surfaces inclined at an outward and downward angle and exposed at said openings, circulating tubes connecting said headers, the upper portion of said tubes being deflected outwardly and connected with the bottom portions of the angularly set upper headers.

2. In a fire box for a boiler, the combination with the back flue sheet and the door sheet, top and bottom headers connecting said sheets, steam drums extending longitudinally of the box and supported by said sheets, circulating tubes connecting said headers, the upper portion of the tubes being deflected outwardly, a water leg extending between the bottom headers, and water tubes extending from the water leg to the door sheet, the upper headers having outwardly and downwardly inclined upper surfaces exposed extending at the sides of the boiler.

3. In a fire box for a boiler, spaced drums, a fire brick disposed between the drums and having concaved sides engaging the drums, and a stirrup having concaved sides engaging the concaved sides of the brick and interlocked therewith.

4. In a fire box for a boiler, the combination with a fire brick having concaved sides each provided with a recess, of a stirrup having concaved sides terminating in inturned lugs, said lugs being adapted to enter said recesses.

5. In a fire box for a boiler, a throat sheet, back flue sheet, door sheet and back head, longitudinally disposed drums connecting the back flue sheet, door sheet and back head, a bottom circulating frame having longitudinal headers connecting at their ends with said sheets and a transversely disposed circulating leg between its transverse center and its ends, connected with the back flue sheet, top headers connected with the drums, vertical circulating tubes connecting the top headers with the longitudinal headers of said bottom frame, and tubes connecting said transverse leg with the door sheet, said top headers having outwardly and downwardly inclined upper surfaces provided with hand holes and exposed exteriorly at the sides of the boiler.

6. In a fire box for a boiler, a throat sheet, back flue sheet, door sheet and back head, longitudinally disposed drums connecting the back flue sheet, door sheet and back head, a bottom circulating frame having longitudinal headers connecting at their ends with said sheets and a transversely disposed circulating leg between its transverse center and its ends, connected with the back flue sheet, obliquely inclined top headers of rectangular cross section connected with the drums, and having their upper surfaces inclined at an outward and downward angle, vertical circulating tubes connecting the top headers with the longitudinal headers of said bottom frame, and tubes connecting said transverse leg with the door sheet, said top headers having hand hole openings in their inclined upper surfaces exposed exteriorly of the fire box.

7. In a fire box for a boiler, a throat sheet, back flue sheet, door sheet and back head, longitudinally disposed drums connecting the back flue sheet, door sheet and back head, a bottom circulating frame having longitudinal headers connecting at their ends with said sheets and a transversely disposed circulating leg between its transverse center and its ends connected with the back flue sheet, obliquely inclined top headers of rectangular cross section connected with the drums, and having their upper surfaces inclined at an outward and downward angle, vertical circulating tubes connecting the top headers with the longitudinal headers of said bottom frame, and tubes connecting said transverse leg with the door sheet, said top headers having hand hole openings in their inclined upper surfaces exposed exteriorly of the fire box, and a cover for said top headers operable from the exterior of the fire box structure whereby said hand holes are accessible from the exterior, said cover normally overhanging said inclined header surfaces provided with said hand holes.

8. In a fire box for a boiler, a throat sheet, back flue sheet, door sheet, and back head, longitudinally disposed drums connecting the back flue sheet, door sheet and back head, a bottom circulating frame having longitudinal headers connecting at their ends with said sheets and a transversely disposed circulating leg between its transverse center and its ends connected with the back flue sheet, circulating tubes connecting said leg with the back flue sheet, obliquely inclined top headers connected with said drums, and having their upper surfaces exposed at the sides of the boiler and provided with hand holes and vertical circulating tubes connecting the top headers with the longitudinal headers of said bottom frame, and tubes connecting said transverse leg with the door sheet.

9. In a fire box for a boiler, a throat sheet, back flue sheet, door sheet, and back head, longitudinally disposed drums connecting the back flue sheet, door sheet and back head, a bottom circulating frame having longitudinal headers connecting at their ends with said sheets and a transversely disposed circulating leg between its transverse center and its ends connected with the back flue sheet, circulating tubes connecting said leg with the door sheet, obliquely inclined top headers connected with said drums, the upper surfaces of said headers being outwardly and downwardly inclined and vertical circulating tubes connecting the top headers with the longitudinal headers of said bottom frame, hand hole openings in the inclined top surfaces of the top headers, exterior of the fire box, closures for said openings, and a cover for said top headers operable from the exterior of the fire box structure.

10. In a fire box for a boiler, the combination with the side vertical circulating tubes, of fire brick laid on said tubes, a sheet covering the exterior of said brick, angle bars mounted on said sheet, sheets superposed on said angle bars with the side edges clamped between said bars, and an insulating material secured between said sheets.

11. A fire box for a boiler comprising a shell having side walls, front and rear hollow wall portions forming front and rear water legs, a foundation frame presenting lower longitudinal headers at opposite sides of the fire box connected at their ends to said water legs and a transverse water leg extending between and communicating with said headers, drums extending between and connected with the water legs on opposite sides of the vertical center of the fire box, said side walls of the shell having openings therein in line with said drums, upper headers of rectangular cross section arranged at an oblique angle to the horizontal on the outer sides of said drums, and projecting outwardly through said openings beyond said side walls, water circulating tubes extending between the upper and lower headers at each side of the fire box, and circulating tubes extending in a direction longitudinally of the fire box and connected to the transverse header and one of the water legs.

12. A fire box for boilers comprising a shell having hollow front and rear wall portions forming front and rear water legs, a foundation frame presenting longitudinally extending lower headers connected at their ends to said water legs and a transverse water leg extending between and communicating with said headers, drums arranged at the top and on opposite sides of the vertical center of the fire box and connected at their ends with the front and rear water legs, the side walls of the shell being provided with openings in line with the drums, upper headers of rectangular cross section arranged on the outer sides of the drums and communicating therewith, said upper headers being inclined at an oblique angle to the horizontal and arranged in line with said openings and projecting therethrough beyond the side walls, circulating tubes at each side of the fire box extending upwardly from the lower header and having their outer ends bent outwardly at an angle and connected with the upper header, and circulating tubes extending in a direction longitudinally of the fire box and connecting the front water leg with the transverse water leg of the foundation frame.

13. In a fire box structure, hollow front and rear wall portions forming front and rear water legs, a foundation frame presenting longitudinally extending headers connected at their ends with the front and rear water legs and a transverse water leg extending between and communicating with said headers, drums arranged at the top and on opposite sides of the fire box and connected at their ends with the front and rear water legs, side walls having their upper edges terminating adjacent to the drums and forming openings opposite the outer surfaces of the drums, upper headers communicating with the drums and arranged on the outer sides thereof at an oblique angle in line with said openings and projecting therethrough beyond the side walls, circulating tubes at each side of the fire box connected at their lower ends with the lower headers and having their upper ends bent outwardly at an angle and connected with the upper headers, circulating tubes extending longitudinally of the fire box and connecting the front water leg with the transverse water leg of the foundation frame, and movable doors mounted exteriorly of the fire box for normally closing the openings and covering the upper headers and for permitting access thereto.

14. In a boiler fire-box, a shell having side walls provided with openings, a drum in the upper portion of the shell at each side thereof, lower headers in the shell, upper headers in the shell arranged between the drums and openings in the side walls, and tubes connecting each header with a lower header, each upper header having clean-out apertures in its upper surface in line with the upper ends of the tubes, and each upper header and the upper ends of the tubes connected therewith being offset outwardly beyond the planes of the body portions of said tubes to partially project the header through the opening in the adjacent side wall of the shell and thereby dispose the apertured surface of the header on the exterior of the shell.

15. In a boiler fire-box, a shell having side walls provided with openings, a drum in the upper portion of the shell at each side thereof, lower headers in the shell, upper headers in the shell arranged between the outer sides of the drums and openings in the side walls, tubes connecting each upper header with a lower header, each upper header having clean-out apertures in its upper surface in line with the upper ends of the tubes, and each upper header and the upper ends of the tubes connected therewith being offset outwardly beyond the planes of the body portions of said tubes to partially project the header through the opening in the adjacent side wall of the shell and thereby dispose the apertured surface of the header on the exterior of the shell, and a door on each side wall movable to cover the opening and enclose the projecting portion of the header or to expose said header.

16. In a boiler fire-box, a shell having side walls provided with openings, a drum in the upper portion of the shell at each side thereof, lower headers in the shell, upper headers of rectangular cross section in the shell between the outer sides of the drums and openings in the side walls, and tubes connecting the lower headers with the bottom walls of the upper headers, the top walls of the upper headers having clean-out apertures in line with the upper ends of the tubes, and each upper header and the upper ends of the tubes connected therewith being offset laterally beyond the planes of the body portions of said tubes so as to partially project the header through the adjacent side wall opening with its apertured top wall sloping outwardly and downwardly to afford convenient access to the clean-out apertures.

17. In a boiler fire-box, a shell having side walls provided with openings, a drum in the upper portion of the shell at each side thereof, lower headers in the shell, upper headers of rectangular cross section in the shell between the outer sides of the drums and openings in the side walls, and tubes connecting the lower headers with the bottom walls of the upper headers, the top walls of the upper headers having clean-out apertures in line with the upper ends of the tubes, and each upper header and the upper ends of the tubes connected therewith being offset laterally beyond the planes of the body portions of said tubes so as to partially project the header through the adjacent side wall opening with its apertured top wall sloping outwardly and downwardly to afford convenient access to the clean-out apertures, and a door on each side wall movable to cover the opening and enclose the projecting portion of the header or to expose said header.

18. In a locomotive boiler having a running board, a fire-box shell having a side wall provided with an opening therein located above said running board, a lower header and an upper header in the shell, and water tubes connecting said headers, the upper surface of the upper header having clean-out apertures in line with the tubes, and said header and the upper ends of the tubes being offset outwardly so as to project the apertured portion of the header through the side wall opening to the exterior of the shell and disposed said apertured header portion at an outward and downward angle of inclination, whereby the clean-out apertures may be more readily reached for a clean-out action by a person standing on the running board.

In testimony whereof I affix my signature.

GEORGE H. EMERSON.